Dec. 24, 1940.　　F. WESTCOTT ET AL　　2,226,038
STEERING GEAR
Filed March 25, 1939　　6 Sheets-Sheet 1

Inventors
Frank Westcott &
John Norwood
by
Blackmore, Spencer & Flint
Attorneys

Dec. 24, 1940.   F. WESTCOTT ET AL   2,226,038
STEERING GEAR
Filed March 25, 1939   6 Sheets-Sheet 2

Inventors
Frank Westcott &
John Norwood
by
Blackmore, Spencer & Flint
Attorneys

Dec. 24, 1940.  F. WESTCOTT ET AL  2,226,038
STEERING GEAR
Filed March 25, 1939  6 Sheets-Sheet 3

Inventors
Frank Westcott &
John Norwood
by
Blackmore, Spencer & Flint
Attorneys

Patented Dec. 24, 1940

2,226,038

UNITED STATES PATENT OFFICE 2,226,038

STEERING GEAR

Frank Westcott, Harpenden, and John Norwood, Kimpton, England, assignors to General Motors Corporation, Detroit, Mich., a corporation of Delaware Application March 25, 1939, Serial No. 264,070
In Great Britain March 29, 1938

5 Claims. (Cl. 74—499)

This invention relates to steering gears for motor vehicles and particularly to the adjustment of toothed gearing therein.

The object of the invention which can be applied to various forms of steering gear, is to simplify the adjustment of such toothed gearing for the elimination of backlash.

The adjustment is effected by relative movement between the inter-engaging tooth or like members in the direction of an axis, and this is made possible by making the teeth on one or both of the two inter-meshing members of tapered thickness. The teeth may be cut by any of the usual generating methods.

In the embodiments of the invention hereinafter particularly described various forms of inter-engaging members are used: the rocker shaft carries a toothed member which may be a gear sector; and the steering shaft carries a grooved member which may be a rack or a worm. In all cases, adjustment is effected by a relative movement between the two members, preferably an axial movement of the rocker shaft.

The scope of the invention is indicated by the appended claims, and its nature will be better understood from the following description taken in conjunction with the accompanying drawings, in which—

In the various figures, like reference characters indicate like parts.

Figure 1:
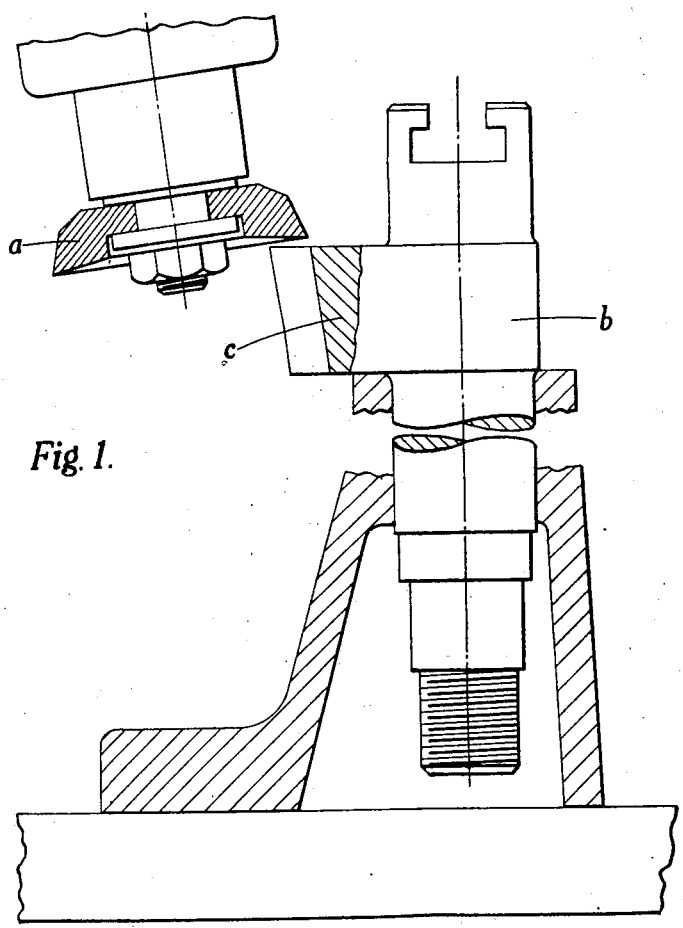
Figure 1 is a diagram illustrating the preferred method of forming a tapered tooth gear for use in a steering gear.

The simplest and preferred method of forming the tapered tooth gear is by generating with a shaping cutter as used for example in a Fellows machine. A rotary or rack cutter may be used; and the former is shown in the diagram of Figure 1. The machine is of standard form but with the difference that the cutter $a$ moves at an angle to the axis of the shaft $b$ carrying the sector blank $c$. It is not considered necessary to show the various internal parts of the machine for ensuring the usual relative rolling and like movements between the cutter and the work. It will be noticed that the outer surface of the sector is conical, the generating line being parallel to the direction of the stroke of the cutter $a$.

If desired the gear may be cut by a hob and the simplest arrangement, to produce the required tapered tooth, is to give the hob a stroke at an angle to the work axis as above described. This angular movement can be obtained, alternatively, by producing a relative infeed of the cutter towards the work during the working stroke.

In making the teeth by another method one side of each tooth is first cut at an angle as in cutting an ordinary helical pinion and then the opposite side of each tooth is cut but with the angle reversed. In this way each tooth will be tapered, from one side of the gear to the other. The cutting tool in such a case must be narrow enough to pass through the narrowest part of the space between successive pairs of teeth. A rack can be cut in a similar manner, by successive cuts on opposite sides of each tooth, at reversed angles.

Figure 2:
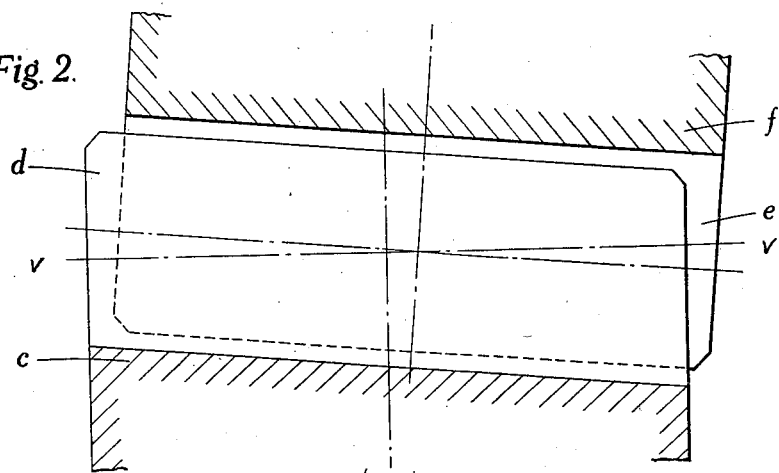
Figures 2 and 3 are respectively end and side views of a tapered tooth gear, formed according to the method illustrated by Figure 1, meshing with a rack.
Figure 3:
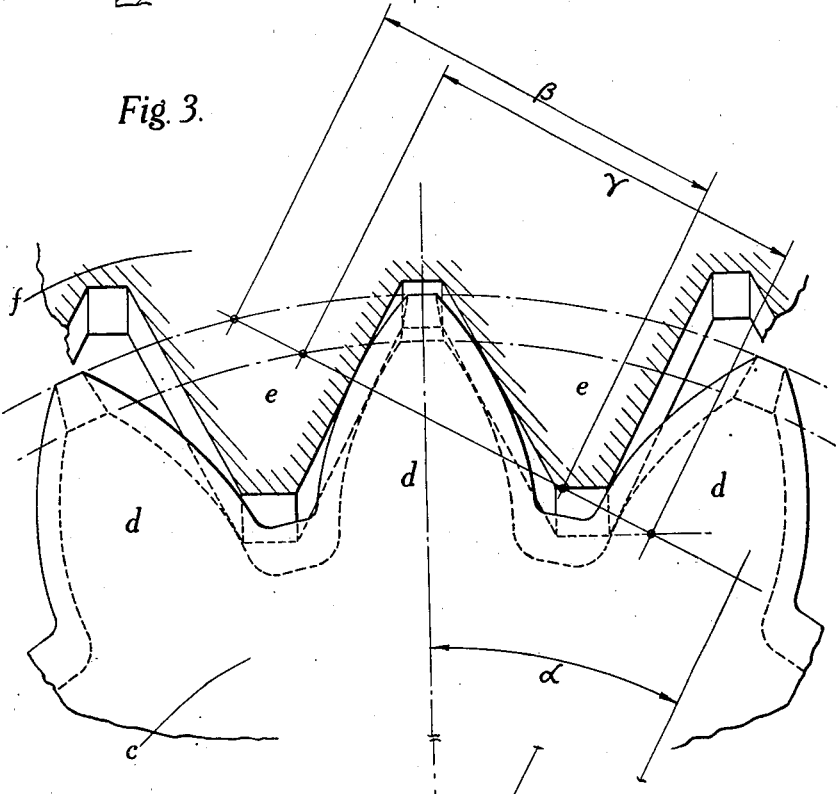

In Figures 2 and 3 are shown on an enlarged scale the teeth $d$ of a sector $c$, cut according to the method illustrated in Figure 1, meshing with teeth $e$ of a rack $f$. The teeth $d$ which are true involutes off the same base cylinder cut to pressure angle $\alpha$, mesh with the straight-cut teeth $e$ of rack $f$ which as shown in Figure 3 is set obliquely. The teeth $d$ increase in thickness from the smaller diameter to the greater diameter; that is from the right to the left of Figure 2, and from the dotted shape to the full line shape of Figure 3. Line contact between the sector teeth $d$ and rack teeth $e$ is maintained across the whole width of the gear in all positions of engagement, this line being a skew line relative to the sector axis. The lengths of the respective lines of action at the thick and thin ends of the teeth $d$ are shown in Figure 3 by $\beta$ and $\gamma$ respectively. As shown in Figure 2, the addendum of a tooth $d$ increases and the dedendum decreases, relative to the virtual side $v$—$v$ of the pitch cylinder, from the right-hand side to the left-hand side; whilst the root diameter and outside diameter increase from the right-hand side to the left-hand side, the tooth depth being constant. Although the rack teeth $e$ are parallel cut, yet due to their oblique disposition their effective addendum and dedendum vary inversely to those of the teeth $d$, across the tooth width. This allows for any required axial adjustment of the sector $c$ and rack $f$.

How such toothed members are used in steering gears on motor vehicles will now be described with reference to Figures 4 to 9. In each form of gear, adjustment can easily be made by movement of rocker shaft inwardly towards the steering shaft.

Figure 4:
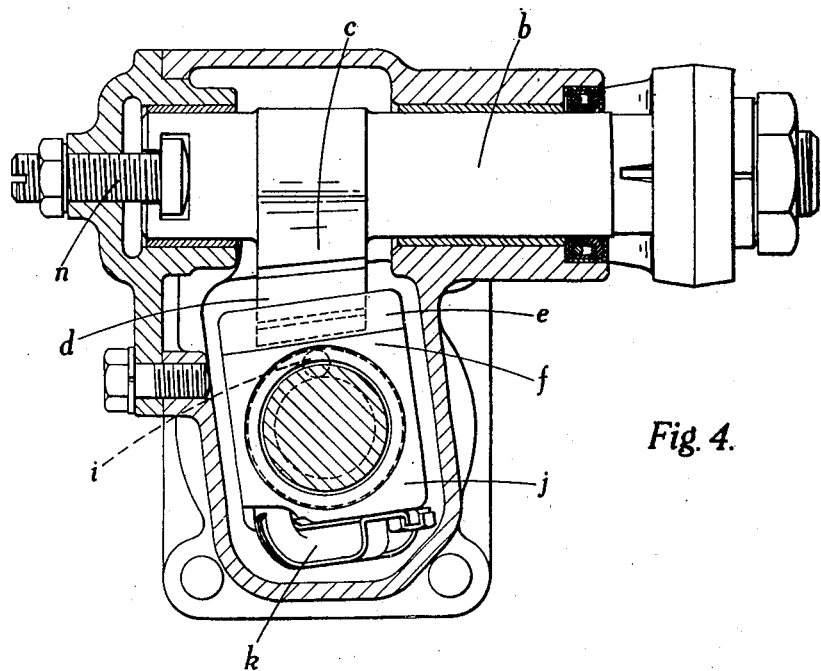
Figures 4 and 5 are respectively transverse and longitudinal sectional views of one form of steering gear according to the invention, the two toothed members engaging in the manner shown in Figures 2 and 3.
Figure 5:
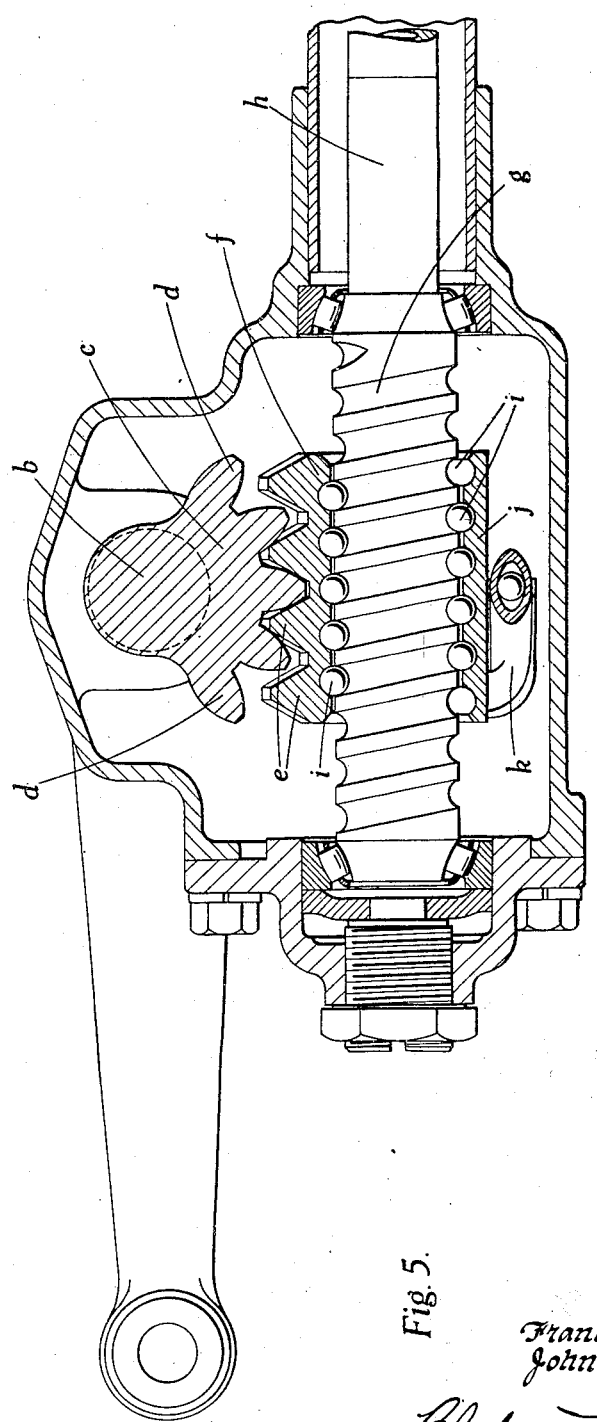

In the steering gear shown in Figures 4 and 5 a worm $g$ mounted on the steering shaft $h$ carries a series of balls $i$ held partly in the thread of the worm and partly within an internal thread in a cage member $j$. Rotation of the shaft $h$ and worm $g$ causes the balls $i$ to circulate around the threads, and the cage member is carried axially along the worm. The balls are returned from one end of the cage member $j$ to the other, externally by means of a conduit $k$ on the cage member. On the cage member is cut an ordinary straight rack $f$ as shown in Figures 2 and 3. Meshing with this rack is the toothed sector $c$ formed as described above. The sector is mounted on the rocker shaft $b$ which is movable axially in its bearings by means of an external screw adjusting member $n$. Thus, any backlash in the steering gear can be taken up by rotating the screw member $n$ and moving the rocker shaft $b$ axially to the right (Figure 4) so as to slide the tapered teeth $d$ on the sector $c$ into the teeth $e$ of the rack $f$.

The rack $f$ and cage member $j$ are tilted obliquely about the axis of the worm $g$, as clearly seen in Figure 4. Thus while the plane of the surfaces of the tips of the rack teeth is at an angle to the axis of the rocker shaft $b$, it is itself normal to the inclined median longitudinal plane of the cage.

Figure 6:
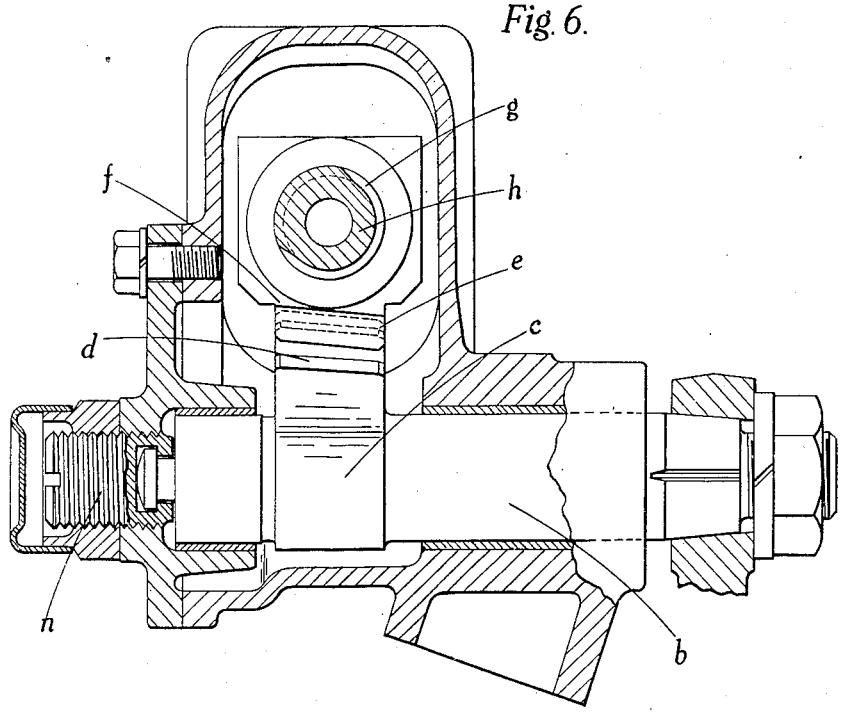
Figures 6 and 7 are similar views of another form of steering gear.
Figure 7:
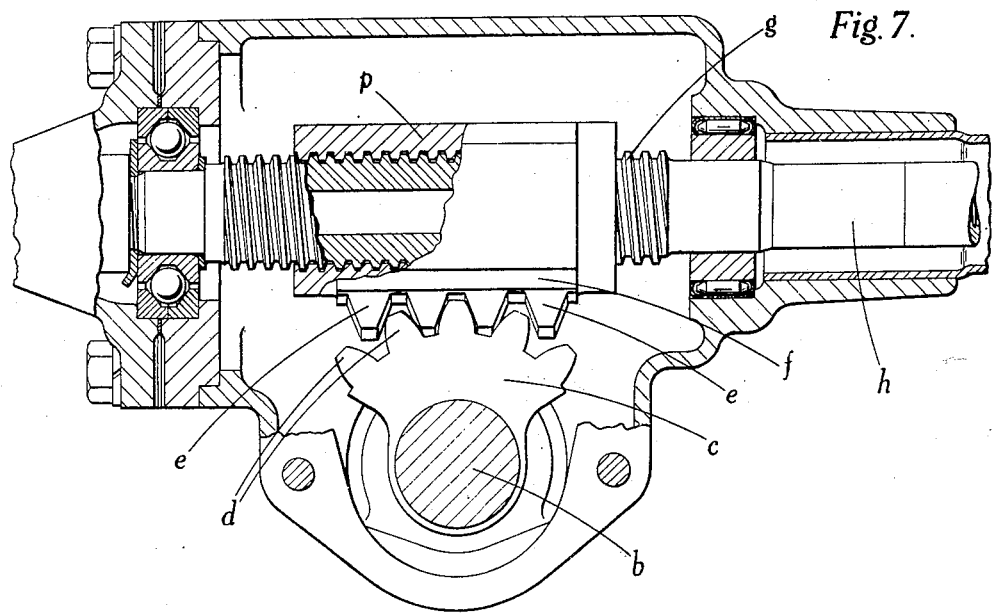

In Figures 6 and 7 a simplified form of rack and sector steering gear is shown. In this construction the worm $g$ carries a nut $p$ directly by means of the usual inter-engaging threads, without the interposition of ball bearings. The nut carries the rack $f$ which engages the sector $c$ as previously described. The rack is cut obliquely instead of being set obliquely. The sector $c$ and the rocker shaft $b$ can be moved axially to the right (Figure 6) to take up backlash, in the manner previously described.

Figure 8:
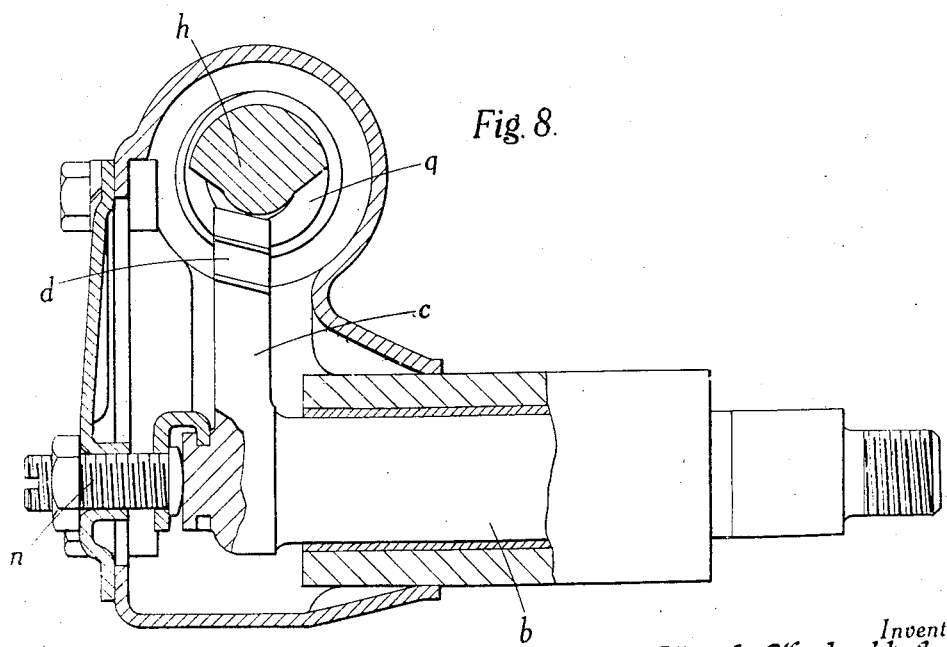
Figures 8 and 9 are similar views of a still further form of steering gear.
Figure 9:
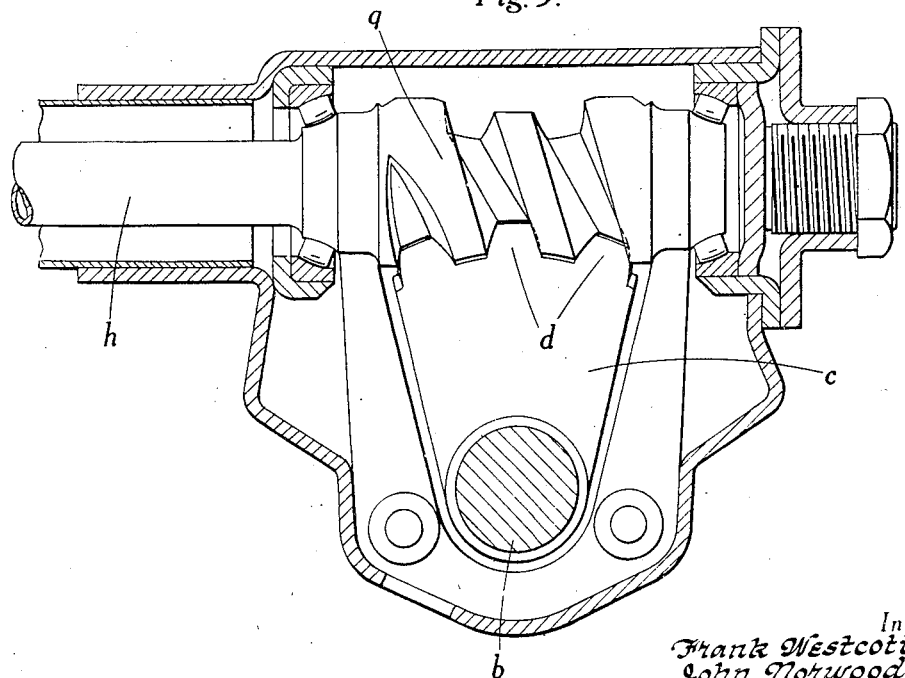

In Figures 8 and 9 there is shown a simple hour-glass-worm, and sector construction. On the steering shaft $h$ is mounted a worm $q$ of the usual hour-glass shape, and meshing with it, is the sector $c$ having tapered teeth $d$ and mounted on the rocker shaft $b$. As will be clear from Figure 8 the sector $c$ can be moved by screw member $n$, to the right, closer to the axis of the worm $q$, and thus take up backlash.

It will be seen from the above that steering gears embodying tapered toothed members, according to the above invention, can take various forms and the above described embodiments are to be taken simply as illustrative in that respect.

We claim:

1. A steering gear for use on motor vehicles, comprising a steering shaft carrying a threaded member, a toothed member on said threaded member and movable axially therealong upon rotation thereof, a rocker shaft carrying a second toothed member meshing with the first toothed member, the teeth of the respective members varying inversely in width and inversely with increasing and decreasing addenda and dedenda, and means for axially adjusting said rocker shaft.

2. A steering gear for use on motor vehicles, comprising a steering shaft carrying a threaded member, a correspondingly internally threaded rack member on said threaded member and movable axially therealong upon rotation thereof, a rocker shaft carrying a toothed member meshing with said rack member, the teeth of the respective toothed members varying inversely in width and inversely with increasing and decreasing addenda and dedenda from one side to the other, and means for axially adjusting said rocker shaft.

3. A steering gear for use on motor vehicles, comprising a steering shaft carrying a threaded member, an internally threaded cage member mounted thereon, a series of balls movable along the mutually opposed threads of said members, a conduit on said cage member for transferring the balls from one end thereof to the other, a rack on said cage member, a rocker shaft carrying a toothed member in operative driving relationship with said rack, the teeth on said toothed member being of constant height of increasing addendum and decreasing dedendum and of increasing width from one side to the other, and means for axially adjusting said rocker shaft.

4. A steering gear for use on motor vehicles, comprising a steering shaft carrying a threaded member, a correspondingly internally threaded rack member mounted thereon, a rocker shaft carrying a toothed member meshing with said rack, the teeth on said toothed member being of constant height of increasing addendum and decreasing dedendum, and of increasing width from one side to the other, and the longitudinal median plane of said rack member being oblique to the rocker shaft axis, and means for axially adjusting said rocker shaft.

5. A steering gear for use on motor vehicles, comprising a steering shaft carrying a threaded member, an internally threaded cage member mounted thereon, a series of balls movable along the mutually opposed threads of said members, a conduit on said cage member for transferring the balls from one end thereof to the other, a rack on said cage member, a rocker shaft carrying a toothed member meshing with said rack member, the teeth of the respective toothed members varying inversely in width and inversely with increasing and decreasing addenda and dedenda from one side to the other and the longitudinal median plane of said rack member being oblique to the rocker shaft axis, and means for axially adjusting said rocker shaft.

FRANK WESTCOTT.
JOHN NORWOOD.